3,674,423
CATALYST FOR NITROGEN OXIDE REDUCTION
Richard L. Klimisch, Mount Clemens, Mich., assignor to General Motors Corporation, Detroit, Mich.
No Drawing. Filed Feb. 9, 1970, Ser. No. 9,979
Int. Cl. B01d 53/34
U.S. Cl. 23—2 E                3 Claims

ABSTRACT OF THE DISCLOSURE

A catalyst for reducing nitrogen oxides in an automobile exhaust gas stream comprising activated alumina pellets containing up to about 10 mole percent zinc oxide.

---

This invention relates to a catalyst for reducing nitrogen oxides, and particularly, to the catalytic reduction of nitrogen oxides contained in exhaust gases from an internal combustion engine to reduce the amount of nitrogen oxide emissions to the atmosphere. More specifically, this invention relates to a catalyst which is effective to reduce nitrogen oxides in exhaust gases from an internal combustion engine regardless of whether the exhaust gas stream constitutes an oxidizing or reducing environment.

Automobile exhaust contains mainly three undesirable components: unburned or partially oxidized hydrocarbons, nitrogen oxides, primarily nitric oxide, and carbon monoxide. The hydrocarbons come from fuel that is not completely oxidized to carbon dioxide and water during engine operation while the nitrogen oxides result from the high temperature dissociation of molecular nitrogen and oxygen from the intake air used to burn the fuel which combine to form the nitrogen oxides. Of the emission components, nitrogen dioxide is believed to be a principal contributor to the so-called "photochemical smog" because the primary photochemical reaction involves the dissociation of nitrogen dioxide by sunlight to nitric oxide and free oxygen, the latter of which combines with molecular oxygen to form ozone. Ozone and various hydrocarbon radicals which combine with ozone in the atmosphere under daylight atmospheric conditions are believed to be the primary constituents of "smog" formation with its attending undesirable effects. In addition, nitric oxide oxidizes to nitrogen dioxide in the exhaust gas stream and in the atmosphere under daylight atmospheric conditions which results in a build-up of oxidants in the atmosphere produced by the primary photochemical reaction. Therefore, it is desirable to remove the nitrogen oxides as well as the hydrocarbons from automotive exhaust.

In order to remove the undesirable components from automotive exhaust, it is necessary to carry out oxidation reactions to remove carbon monoxide and the hydrocarbons and, at the same time, reduction reactions to remove the nitrogen oxides. For effective removal during engine operation these reactions require the use of either an oxidation or reduction catalyst to promote the respective reactions. However, prior to my invention it has not been possible to simultaneously remove both oxidizable and reducible components from exhaust systems because reduction catalysts would not perform adequately in an oxidizing environment and, conversely, oxidation catalysts would not perform adequately in a reducing environment. Prior art attempts to overcome this problem have focused on a two-step process wherein a reducing exhaust stream would first be fed into contact with a reduction catalyst, after which air would be pumped into the exhaust stream to provide an oxidizing environment for the oxidation catalyst. However, these systems are economically undesirable because of the requirement of a dual emission control system and the need for a secondary air source.

Accordingly, it is the principal object of my invention to provide a catalyst for reducing nitrogen oxides.

It is a further object of my invention to provide a reduction catalyst which is effective to reduce nitrogen oxides in an oxidizing environment, and which is, therefore, compatible with oxidizing catalysts.

It is yet a further object of my invention to provide a reduction catalyst which is effective to suppress the formation of nitrogen dioxide in the oxidizing exhaust gas stream.

It has now been found that a catalytic composite formed of a mixture of oxides of zinc and aluminum has the unique ability to reduce nitrogen oxides not only in a reducing environment but also in an oxidizing environment. Thus, this catalyst is compatible with oxidizing catalysts such as copper oxide and vanadium pentoxide which makes it possible to reduce the amount of both types of exhaust emissions in a single relatively simple catalytic reactor.

The catalytic composite of zinc oxide and aluminum oxide is prepared by first dissolving from 5 to 20 parts of zinc nitrate in 35 parts of distilled water to form a solution to which is added 75 parts of alumina. It is advantageous that the alumina be in the form of pellets having a surface area of from 5 to 400 square meters per gram, preferably about 100 square meters per gram, as determined by nitrogen adsorption and have a porosity of the 50% so that they may be effectively used in a fixed bed catalytic reactor structure. The term "pellet" as used herein includes such configurations as spheres, cylinders, tablets and the like. The pellets are stirred and soaked in the zinc nitrate solution for several hours until complete penetration by the zinc nitrate is achieved. After soaking, the pellets are removed from the solution, the excess liquid is drained from the pellets and the pellets are dried in air at room temperature for several hours. The zinc nitrate in the pellets is then converted to zinc oxide by placing the pellets in a furnace and passing air over them at a rate of approximately 500 volumes of air per volume of catalyst per hour and then raising the temperature of the furnace to 550° C. over a period of three hours. The temperature is then maintained at 550° C. for an additional three hours after which the air flow is terminated and the catalyst cooled to room temperature.

As a result of the above-described process a catalytic composite is formed comprising alumina pellets having a surface area of from 5 to 400 square meters per gram and a porosity of about 50% impregnated with 2 to 3 mole percent zinc oxide, which is equivalent to about 1.3% zinc metal. It has been found that small percentages of zinc oxide in the catalyst composite are effective in reducing nitrogen oxide in an exhaust gas stream and that the amount of zinc oxide in the composite should be kept below about 10 mole percent.

The catalytic composite prepared by the above-described process can be used in many well-known catalytic reactor structures in which catalyst pellets are packed in the reactor which is normally located at a suitable position in the exhaust stream away from the engine such that the exhaust gases are passed into contact with the catalyst without the catalyst being heated to an excessively high temperature which causes deterioration of the catalyst structure. The temperatures of exhaust gases entering the reactor from a normally functioning internal combustion engine are typically within the range of 200° to 1500° F. The catalytic composite previously described has been found to be effective within this temperature range.

The exhaust gas from an internal combustion engine contains $CO$, $CO_2$, $H_2O$, $N_2$ and $H_2$ together with the nitrogen oxide, particularly $NO$, unburned hydrocarbons and oxygen. These constituents are present regardless of whether the engine is supplied with less than the stoichiometric amount of air required for combustion (rich mixture) or more than the stoichiometric amount of air (lean mixture). Most engines operate at the stoichiometric point or with excesses of oxygen which results in an oxidizing exhaust gas stream. During acceleration and high speed cruise, the gas stream is particularly highly oxidizing. In accordance with the principal feature of my invention, the reduction of the nitrogen oxides is effected by the carbon monoxide in the oxidizing exhaust gas stream with the catalytic composite previously described promoting the reduction reaction in the oxidizing environment without entering into it.

Reference to the following specific examples will further serve to illustrate my invention and its effectiveness in reducing nitrogen oxide in both a reducing and an oxidizing environment.

EXAMPLE I

A catalytic composite of zinc oxide and activated alumina was prepared by the method previously described. The alumina used was type Al–0104 sold commercially by Harshaw Chemical Company in the form of 1/8 inch cylindrical pellets. The pellets had a surface area of about 100 m.$^2$/g., a porosity of about 50% and a surface pore radius varying from 15–100 A. with the greatest concentration at about 25 A. The composite contained 2 to 3 mole percent zinc oxide. 30 ml. of the composite weighing 30 grams was placed in an electrically heated tubular reactor which was made from a 3/4" I.D. stainless steel pipe. A simulated exhaust gas feed stream was prepared by blending pure cylinder gas to obtain gas concentrations of 1.0% CO; 0.10% NO and a variable $O_2$ concentration of from 0.0 to 1.6% in a nitrogen atmosphere. The feed stream flow rate was 15 s.c.f.h. resulting in a gas hourly space velocity of 14,200. The temperature of the catalyst was 800° F.

In order to demonstrate the effectiveness of the zinc oxide-alumina catalyst, a copper oxide-alumina catalyst was tested under the same conditions. The results of the test are given in Table I.

TABLE I.—COMPARISON OF CATALYST FOR REDUCTION OF NITROGEN OXIDES

| Percent excess oxygen over stoichiometric condition | Percent NO reduction | | Percent NO$_2$ formed | |
|---|---|---|---|---|
| | ZnO-Al$_2$O$_3$ | CuO-Al$_2$O$_3$ | ZnO-Al$_2$O$_3$ | CuO-Al$_2$O$_3$ |
| −0.50 | 98 | 98 | 0 | 0 |
| 0.0 | 87 | 15 | 0 | 3 |
| 0.6 | 33 | 3 | 0 | 16 |
| 1.1 | 18 | 1 | 0 | 12 |

Referring to Table I, it will be noted that both catalysts performed effectively under oxygen deficient (fuel rich) conditions. However, as the amount of oxygen increased to the stoichiometric point where there is neither an oxygen deficient or oxygen rich condition and beyond to where there is an excess amount of oxygen in the system, the copper oxide-alumina catalyst lost its effectiveness. In contrast, the zinc oxide-alumina catalyst maintained substantial activity with relatively large excesses of oxygen. In addition, it will be noted that the formation of nitrogen dioxide with the copper oxide-alumina catalyst began to occur with excess oxygen while the zinc oxide-alumina catalyst completely suppressed the nitrogen dioxide reaction.

EXAMPLE II

In order to determine the effectiveness of the zinc oxide-alumina catalyst under engine conditions, 30 ml. of catalyst prepared as described in Example I was placed in the electrically heated tubular reactor and exhaust from a single-cylinder engine fueled with propane was passed therethrough. The temperature of the catalyst was 950° F. The exhaust gas composition was 0.6% CO, 0.2% $O_2$, 0.12% NO, 360 p.p.m. $C_3H_8$, 9.4% $CO_2$, 12.5% $H_2O$ and 78.1% $N_2$. The gas flow rate was 17.1 s.c.f.h. resulting in a gas hourly space velocity of 16,800. The engine conditions were 1,600 r.p.m., 10° spark retard, 10:1 compression ratio and exhaust back pressure of 10 inches of water.

To demonstrate the effectiveness of the zinc oxide-alumina catalyst, an unsupported copper chromite catalyst was tested under the same conditions. The latter catalyst is a commercial material that has been recommended for reducing nitrogen oxide. The results of the test are give in Table II.

TABLE II.—COMPARISON OF CATALYST FOR REDUCTION OF NITRIC OXIDE IN ENGINE EXHAUST

| Percent excess oxygen over stoichiometric condition | Percent NO reduction | |
|---|---|---|
| | ZnO-Al$_2$O$_3$ | CuO-Cr$_2$O$_3$ |
| −0.5 | 56 | 63 |
| 0.0 | 65 | |
| 0.5 | 52 | 0 |
| 1.0 | 17 | 0 |

Table II shows, as in Example I, that the zinc oxide-alumina catalyst is effective for the reduction of nitrogen oxide even in the presence of excess oxygen. The copper chromite catalyst was effective only under oxygen deficient conditions.

Although my invention has been described in terms of the use of alumina pellets, it will be recognized by those skilled in the art that the alumina may take a variety of structural forms such as a cellular or filamentary body of desired configuration to reduce or eliminate possible attrition losses.

Thus, having described my invention what is claimed is:

1. A process for the catalytic reduction of nitrogen oxides contained in internal combustion engine exhaust gases which comprises passing said gases at elevated temperatures into contact with a catalytic composite consisting essentially of alumina containing sufficient zinc oxide in an amount up to about 10 mole percent effective in reducing the nitrogen oxides.

2. A process for the catalytic reduction of nitrogen oxides contained in internal combustion engine exhaust gases which comprises passing said gases at elevated temperatures into contact with a catalytic composite consisting essentially of alumina having a surface area of from 5 to 400 square meters per gram containing sufficient zinc oxide in an amount up to about 10 mole percent effective in reducing the nitrogen oxides.

3. A process for the catalytic reduction of nitrogen oxides contained in internal combustion engine exhaust gases which comprises passing said gases at elevated temperatures into contact with a catalytic composite consisting essentially of alumina pellets having a surface area of about 100 square meters per gram impregnated with about 2 to 3 mole percent zinc oxide.

References Cited

UNITED STATES PATENTS

| 3,397,154 | 8/1968 | Talsma | 23—2 E |
| 3,271,324 | 9/1966 | Stephens et al. | 23—2 EX |
| 3,476,508 | 11/1969 | Kearby et al. | 23—2 E |
| 3,282,861 | 11/1966 | Innes | 23—2 EX |
| 2,693,497 | 11/1954 | Ballard et al. | 260—681 |
| 3,181,928 | 5/1965 | Frilette et al. | 23—2 E |
| 3,257,163 | 6/1966 | Stiles | 23—2 |
| 3,552,913 | 1/1971 | Stephens | 23—2 |

OSCAR R. VERTIZ, Primary Examiner

G. O. PETERS, Assistant Examiner